Jan. 11, 1966 C. L. SCHULER 3,229,188

SERIES RECTIFIER

Filed June 20, 1962 2 Sheets-Sheet 1

INVENTOR.
CHESTER L. SCHULER

BY James and Franklin

ATTORNEYS

Jan. 11, 1966 C. L. SCHULER 3,229,188

SERIES RECTIFIER

Filed June 20, 1962 2 Sheets-Sheet 2

INVENTOR.
CHESTER L. SCHULER

BY James and Franklin

ATTORNEYS

United States Patent Office 3,229,188
Patented Jan. 11, 1966

3,229,188
SERIES RECTIFIER

Chester L. Schuler, Brooklyn, N.Y., assignor to General Instrument Corporation, Newark, N.J., a corporation of New Jersey Filed June 20, 1962, Ser. No. 203,974
19 Claims. (Cl. 321—27)

This invention relates to series rectifiers, and more particularly to a series silicon diode assembly.

A chain of silicon diodes may be used in series for high voltage work. To help assure uniform voltage distribution it is already known to employ resistors of high value in shunt across the rectifiers. Because difficulty still may arise with transient voltages, as when opening or closing a switch leading to a transformer, it is known to employ capacitors in shunt with the resistors and diodes. Usually the three components (diode, resistor and capacitor) are mounted on cards, and these cards are arranged in a zig-zag array with appropriate series connections from card to card. This conventional arrangement has many disadvantages, including the inductance of the leads, the bulk, and the many exposed connection points which encourage corona discharge when working at high voltage.

The primary object of the invention is to generally improve series rectifiers. More specific objects are to avoid the need for lead wires of appreciable length and their consequent inductance, thereby securing good tranisent response; to provide a shunt capacitor which forms a direct compact part of the structure devoid of separate leads; and to provide a structure characterized by high thermal conductivity, smooth voltage gradient, and good anti-corona configuration. A further object is to provide a series rectifier assembly which is compact in dimension, and which is flexible in manufacture in that any necessary number of standard units may be stacked for operation at a desired voltage.

To accomplish the foregoing general objects, and other more specific objects which will hereinafter appear, my invention resides in the series rectifier assembly and the elements thereof, and their relation one to another, as are hereinafter more particularly described in the following specification. The specification is accompanied by drawings in which.

Figure 4:
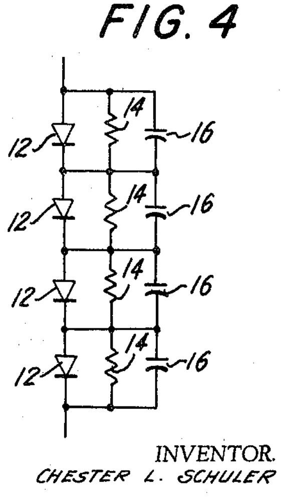
FIG. 4 is a schematic wiring diagram showing how the resistors and capacitors are connected in shunt with the diodes.

Referring to the drawings, and more particularly to FIG. 4, the diodes 12 are connected in series for operation at increased voltage. Resistors 14 of high resistance value are connected in shunt with the diodes to help ensure uniform voltage distribution. Capacitors 16 also are connected in shunt to help obtain uniform distribution of voltage despite sudden high transients. Such an arrangement of resistors and capacitors in shunt with the diodes is well known and is common practice. Usually the three separate elements are mounted on a card, and are connected by wire leads, and a considerable number of such cards are then connected in series.

Figure 1:
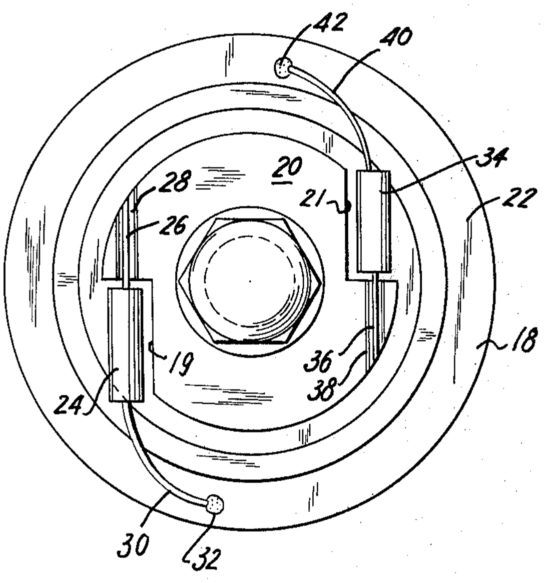
FIG. 1 is an end view of a series rectifier assembly embodying features of the invention.
Figure 2:
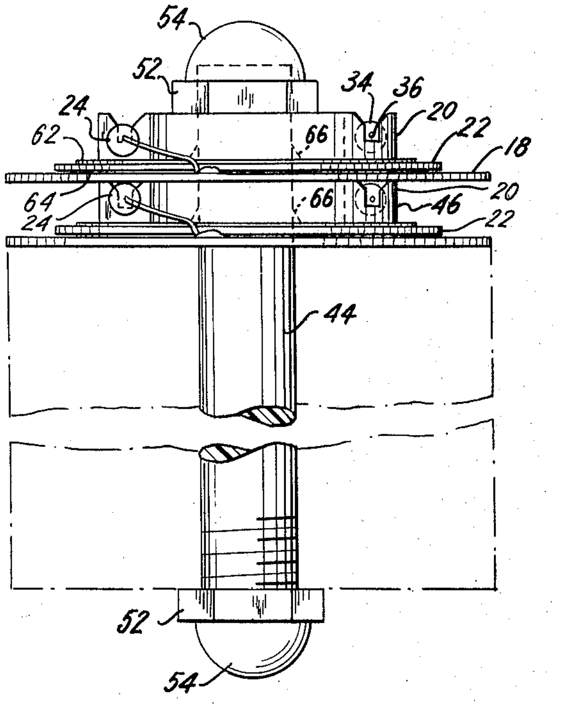
FIG. 2 is a plan view.

Referring now to FIGS. 1 and 2, the present rectifier unit comprises a thin metal disc 18, a thick metal slug 20 of smaller diameter, and a thin insulation disc 22 between the slug 20 and the disc 18. These parts constitute the capacitor. They also act as a heat sink and a fin for heat dissipation.

A silicon diode 24 is nested at the slug, and is electrically connected between the slug 20 and the disc 18. In the present case one lead 26 is received in a groove or channel 28, and is there soldered (or spot welded), and the other lead 30 is soldered (or spot welded) at 32 to the disc 18.

A fixed resistor 34 also is nested at the slug 20, and is electrically connected between the slug and the meal disc. More specifically, one lead 36 is received in a channel 38, and is there soldered (or welded), while the other lead 40 is soldered (or welded) at 42 to the disc 18. In the drawings the solder in channels 28 and 38 has been omitted for clarity.

The slug 20 and the discs 18 and 22 have aligned center holes, adapting them for series assembly in closely spaced face-to-face relation on an insulation rod 44. FIG. 2 shows two such units, and shows how the metal disc 18 of one unit is in direct face-to-face contact with the metal slug 46 of the next or adjacent unit.

Figure 3:
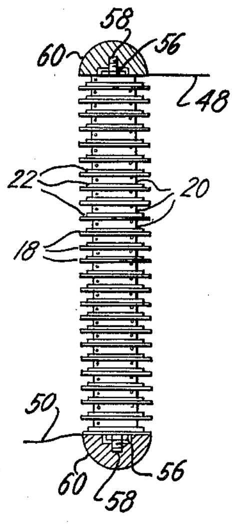
FIG. 3 is a partially sectioned view showing how a large number of units may be stacked in series.

FIG. 3, drawn to smaller scale, shows how a large number of such units may be assembled in face-to-face relation on a rod, the metal disc of one unit being in direct contact with the metal slug of the next unit. There are outgoing leads 48 and 50 at the ends. The rod, or at least the end portions of the rod, are threaded to receive nuts for holding the units in tightly assembled relation. In FIG. 2 the nuts 52 may have integral domes 54. For use at higher voltage, anti-corona domes may fully enclose ordinary nuts, and in FIG. 3, the nuts 56 are received on threaded rod 58, following which large anti-corona domes 60 are screwed on to the ends of the rod 58, the said domes being recessed to house the nuts.

Figure 5:
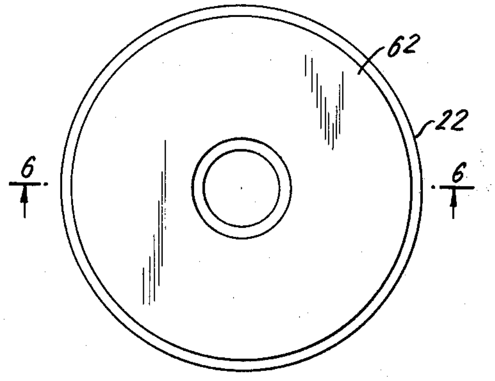
FIG. 5 shows a metallized insulation disc forming part of the structure.
Figure 6:
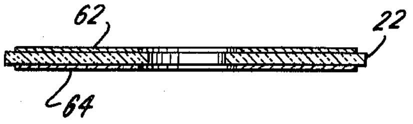
FIG. 6 is a section taken in the plane of the line 6—6 of FIG. 5.

The insulation disc 22 may be a disc of a suitable plastic material such as "Mylar." However, I prefer to employ a ceramic disc, and it is convenient to establish a fixed capacitance value by metallizing the faces of the disc. This is shown in FIGS. 5 and 6, referring to which the ceramic disc 22 is coated with a thin metal film, typically silver, as shown at 62 and 64. The edges of the coated annular area are spaced somewhat from the inner and outer edges of the ceramic disc, in order to increase the leakage path. Consistent with this, and reverting to FIG. 2, the hole through slug 20 is bevelled at 66. This bevelling prevents the slug from shortening the leakage path between the metal surfaces 62 and 64 at the inner edge or hole through the disc.

Reverting to FIG. 1, the periphery of the slug 20 is oppositely stepped at opposite edges, as shown at 19 and 21. This provides two recesses, one of which receives a glass sealed diode 24, and the other of which receives resistor 34. The portions of the slug adjacent the stepped recesses have the channels 28 and 38 for the leads 26 and 36.

Figures 7, 8:
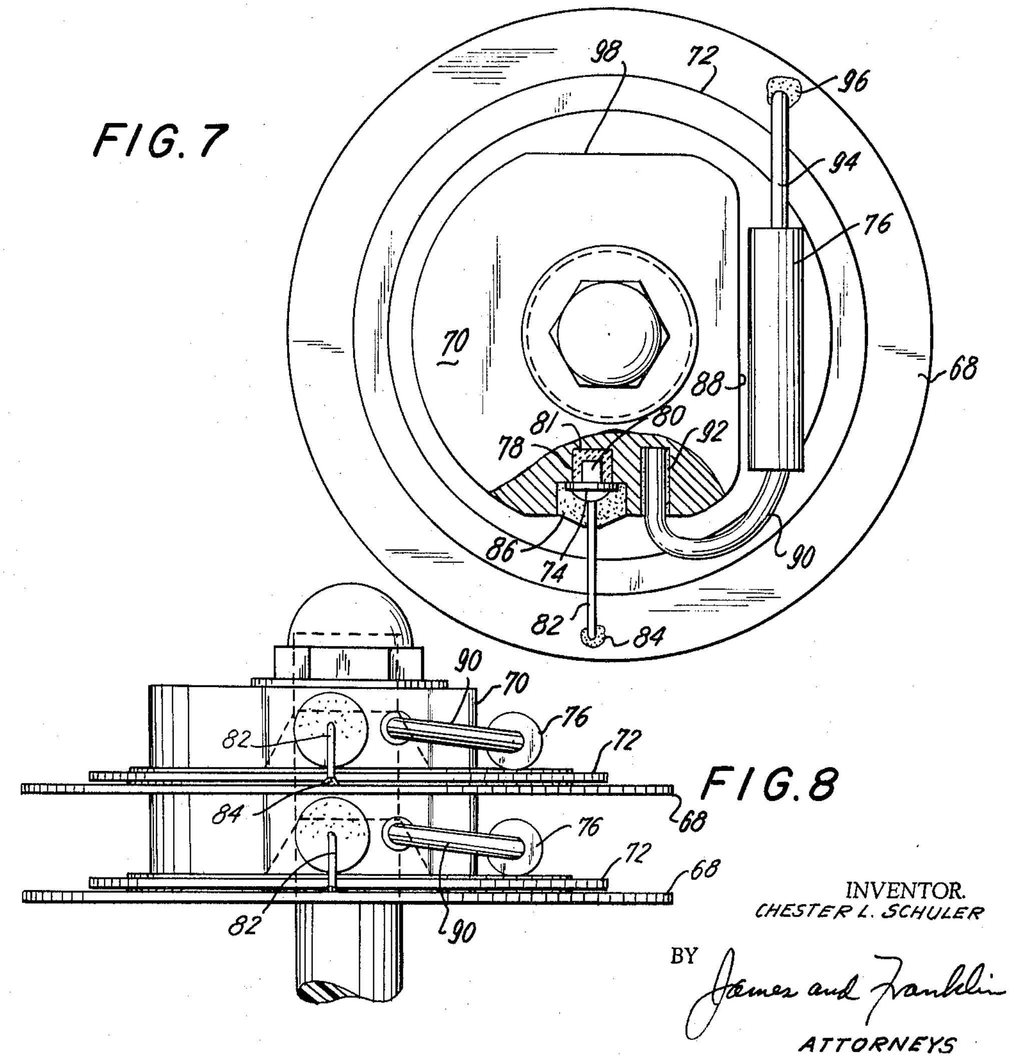
FIG. 7 is a partially sectioned view showing a modified form of rectifier unit.
FIG. 8 is an edge view of several of the units shown in FIG. 7.

A modified form of the invention is illustrated in FIGS. 7 and 8 of the drawings. Here again each unit comprises a thin metal disc 68, a thick metal slug 70 of smaller diameter, and an insulation disc 72 of intermediate diameter therebetween, the latter preferably being a metal-surfaced ceramic disc the same as that described in connection with FIGS. 5 and 6. Here again, there is a silicon diode 74 and a fixed resistor 76 which are nested at the slug, and which are electrically connected between the slug and the metal disc 68. Again, the disc 68 acts as a heat radiating fin, and the slug 70 acts not only as a spacer but also as a heat sink.

The main difference in the present structure is that it employs a less expensive type of silicon diode which has not been sealed in an envelope. For most purposes it has been found adequate to seal the diode in an epoxy material. The diode here is larger in rating. The periphery of the slug 70 may be provided with a stepped cylindrical radial pocket 78 for the diode, the inner terminal 80 of which is soldered at 81 in pocket 78, and the other terminal or wire lead 82 of which extends outward and then turns downward and is soldered or spot welded at 84 to disc 68. Lead 82 is clear of disc 72. The diode is protectively sealed in pocket 78 by means of epoxy material indicated at 86.

Another difference is that the slug 70 is flattened at 88 to receive or nest a resistor 76 of larger dimension. Because the slug is flattened instead of being notched or stepped, the lead 90 is reversely bent and inserted in a hole 92 in which it is soldered. Because of the thickness of the slug 70 there is no need to insulate the lead 90. The other lead 94 is soldered or spot welded at 96 to the metal disc 68.

For convenience in assembly, the slug 70 is also flattened at 98. This facilitates registered orientation of all of the units when assembling a number of such units on a rod. The assembly operation may be performed in a jig having parts on which the flats 98 are rested while an insulation rod is passed through the discs, and then end nuts and terminal wires are applied to the threaded ends of the rod. It will be understood that the units of FIG. 7 are assembled on an insulation rod much as described in connection with FIGS. 2 and 3, and that the ends similarly may be provided with finished nuts, or with large anti-corona domes enclosing ordinary nuts.

It will also be understood that while not shown in the drawings, the assembly may include end brackets which may serve as supports as well as terminals for the series rectifier. The assembly also may be vertical.

By way of example, and not in limitation of the invention, a single diode 24 (FIG. 1) may operate at say 600 volts and carry one ampere. By assembling 25 units a voltage of 15,000 may be provided. This is the peak inverse voltage. The ceramic discs have a diameter of one inch, and a thickness of 0.02 inch including the silver coating, or 0.018 inch before coating. The uncoated margin at the edges preferably has a width of 0.063 inch. Such a capacitor has a capacitance value of 0.002 mf.

In the example given, the metal disc 18 has a diameter of 1¼ inch, and the metal slug 20 has a diameter of ¾ inch, and a thickness of 0.115 inch. The material of the slug 20 is sintered copper. The metal disc 18 is made of sheet copper.

In this structure the copper discs act as heat dissipating fins. The metal slugs act not only as spacers, but also as heat sinks. The capacitor itself is a direct part of the structure, requiring minimum bulk, and it has the same temperature all over because it is enclosed between metal fins and heat sinks. The circular configuration guards against corona breakdown. The electrostatic stress manifests itself at the large diameter of the disc. Moreover, the voltage is graded from disc to disc, there being an orderly stress pattern, with voltage gradation in small steps along the cylinder of fins. These act much like a smooth cylinder, with each fin helping to shield the next one. The cylindrical geometry is ideal from the viewpoint of minimizing corona breakdown. The voltage can go up to say 50,000 volts with a 1¼ inch disc as shown. It could go up to say 100,000 volts with a three inch disc.

The assembly shown in FIGS. 7 and 8 utilizes a larger capacity diode. One capable of carrying say ten amperes may be safely operated in practice at six amperes, using the present size slug and disc, but by increasing the size of the slug and disc, the diode could be operated at its full rated ten amperes.

In manufacture a first step is to weld or solder the resistor and diode leads to the slug. These are then assembled with the capacitor disc and the thin fin disc, the outer leads of the diode and resistor being soldered or welded to the fin disc, to complete the assembly of one unit. Any desired number of units are then assembled, preferably with the aid of a jig, on a rod of suitable length, and the end nuts are applied to clamp the units tightly together.

For completeness, it may be mentioned that four units may be assembled with appropriate terminal leads for use as a bridge or doubler, etc. and going further, four strings of units may be mounted on one stud for use as a bridge or doubler operating at higher voltage.

A vacuum tube base may be used at one end (only one pin being used), and a tube cap then is used at the top, the stack being vertical. Such a construction may be used in lieu of a rectifier vacuum tube previously used.

It is believed that the construction and method of assembly and use of my improved series rectifier, as well as the advantages thereof, will be apparent from the foregoing detailed description. There is a good transient response because there is no lead wire inductance; there is good thermal conductivity from junction to junction, with a minimum difference in operating temperature; there is a smooth voltage gradient and a cylindrical configuration from end to end, both being ideal to minimize corona discharge; and there is flexibility in varying the package in that any desired number of units may be stacked to desired voltage. An increase in carrying capacity is obtainable by increasing the diameter of the copper fins, without any other change, and this alone will increase the corona protection and the thermal cooling. Of course a still more serious change may be made by varying the thickness of the heat sink. Another advantage is compactness, because there is no separate packaging of a cylindrical capacitor as heretofore used. In the old style card, the capacitor was the largest component on the card.

It will be understood that the quantitative values and dimensions given above have been given solely by way of example, and are not intended to be in limitation of the invention. It will also be understood that while I have shown and described my invention in several preferred forms, changes may be made in the structures shown without departing from the scope of the invention as sought to be defined in the followings claims.

I claim:

1. A flat rectifier unit for use as one of a stack of such units which are stacked in aligned face-to-face relation to provide a series rectifier assembly having shunt capacitors, said unit comprising a thin flat metal fin, a thick flat metal slug of smaller diameter than the fin, a thin flat solid insulation member, said fin, slug and insulation member being disposed in face-to-face relation with said insulation member between the adjacent faces of said slug and metal fin, and a diode nested at the edge of said slug and electrically connected between said slug and said metal fin, said diode being confined to the space between the the fin and the plane of the outer face of the slug, said fin acting as a condenser plate and as a cooling fin, said slug acting as a condenser plate and as a heat sink and as a spacer when a plurality of such flat units are stacked in face-to-face relation, the slug of one unit then being in electrical contact with the fin of the next unit.

2. A flat rectifier unit for use as one of a stack of such units which are stacked in aligned face-to-face relation to provide a series rectifier assembly having shunt resistors and capacitors, said unit comprising a thin flat metal fin, a thick flat metal slug of smaller diameter than the fin, a thin flat solid insulation member, said fin, slug and insulating member being disposed in face-to-face relation with said insulation member between the adjacent faces of said slug and metal fin, a diode nested at the edge of said slug and electrically connected between said slug and said metal fin, and a fixed resistor nested at the edge of said slug and electrically connected between said slug and said metal fin, said diode and said resistor being confined to the space between the fin and the plane of the outer face of the slug, said fin acting as a condenser plate and as a cooling fin, said slug acting as a condenser plate and as a heat sink and as a spacer when a plurality of such flat units are stacked in face-to-face relation, the slug of one unit then being in electrical contact with the fin of the next unit.

3. A flat rectifier unit for use as one of a stack of such units which are stacked in aligned face-to-face relation to provide a series rectifier assembly having shunt capacitors, said unit comprising a thin circular metal fin, a thick metal slug of smaller diameter than the disc, a thin insulation disc between the adjacent faces of said slug and metal fin, and a diode nested at the edge of said slug and electrically connected between said slug and said metal fin, said diode being confined to the space between the fin and the plane of the outer face of the slug, said fin acting as a condenser plate and as a cooling fin, said slug acting as a condenser plate and as a heat sink and as a spacer when a plurality of such flat units are stacked in face-to-face relation, the slug of one unit then being in electrical contact with the fin of the next unit, said fins and slugs and discs having center holes adapting the same for series assembly of such units in closely spaced face-to-face relation on a center rod to form a finned cylinder.

4. A flat rectifier unit for use as one of a stack of such units which are stacked in aligned face-to-face relation to provide a series rectifier assembly having shunt resistors and capacitors, said unit comprising a thin circular metal fin, a thick metal slug of smaller diameter than the disc, a thin insulation disc between the adjacent faces of said slug and metal fin, a diode nested at the edge of said slug and electrically connected between said slug and said metal fin, and a fixed resistor nested at the edge of said slug and electrically connected between said slug and said metal fin, said diode and said resistor being confined to the space between the fin and the plane of the outer face of the slug, said fin acting as a condenser plate and as a cooling fin, said slug acting as a condenser plate and as a heat sink and as a spacer when a plurality of such flat units are stacked in face-to-face relation, the slug of one unit then being in electrical contact with the fin of the next unit, said fins and slugs and discs having center holes adapting the same for series assembly of such units in closely spaced face-to-face relation on a center rod to form a finned cylinder.

5. A high voltage series rectifier assembly comprising a series of rectifier units assembled in face-to-face relation, each unit including a diode, a resistor and a capacitor constructed and connected in shunt relation as defined in claim 2, the metal fin of one unit being in face-to-face contact with the metal slug of the next unit, and means for holding said units in tightly assembled relation.

6. A high voltage series rectifier assembly comprising a rod having a series of units assembled in face-to-face relation on said rod, each unit including a diode, a resistor and a capacitor constructed and connected in shunt relation as defined in claim 4, the metal disc of one unit being in face-to-face contact with the metal slug of the next unit, and means at the ends of said rod holding said units in tightly assembled relation.

7. A high voltage series rectifier assembly comprising an insulation rod having threaded ends, a series of units assembled in face-to-face relation on said rod, each unit including a diode, a resistor and a capacitor constructed and connected in shunt relation as defined in claim 4, the metal disc of one unit being in face-to-face contact with the metal slug of the next unit, nuts at the ends of said rod holding said units in tightly assembled relation, and anti-corona domes at the ends of said rod.

8. A high voltage series rectifier assembly as defined in claim 7, in which the insulation discs are thin ceramic discs, the opposite faces of which are metallized over an annular area the edges of which are spaced somewhat from the inner and outer edges of the ceramic discs.

9. A unit for a series rectifier assembly as defined in claim 1, in which the insulation is a thin ceramic disc, the opposite faces of which are metallized over an area the edges of which are spaced somewhat from the edges of the ceramic disc.

10. A unit for a series rectifier assembly as defined in claim 4, in which the insulation disc is a thin ceramic disc, the opposite faces of which are metallized over an annular area the edges of which are spaced somewhat from the inner and outer edges of the ceramic disc.

11. A unit as defined in claim 2, in which the periphery of the slug is stepped to provide recesses for the reception of the resistor and the diode, and in which the portions of the slug adjacent the steps are channeled to receive a lead wire from said diode and said resistor.

12. A unit as defined in claim 4, in which the periphery of the slug is oppositely stepped at opposite edges to provide recesses for the reception of the resistor at one edge and the diode at the other edge, and in which the portions of the slug adjacent the steps are channeled to receive a lead wire from said diode and said resistor.

13. A unit as defined in claim 2, in which the periphery of said slug is flat at one side and there receives the resistor, and in which the periphery of the slug at another point has a pocket for the diode, one terminal of the diode being soldered in the bottom of said pocket, and the remainder of said diode being covered and sealed in said pocket by an insulation material.

14. A unit as defined in claim 2, in which the periphery of said slug is flat at one side and there receives the resistor, and in which the periphery of the slug at another point has a pocket for the diode, one terminal of the diode being soldered in the bottom of said pocket, and the remainder of said diode being covered and sealed in said pocket by an insulation material, and in which another part of the periphery of the slug also is flat to facilitate registered orientation of all of the units when assembling the same.

15. A unit as defined in claim 4, in which the periphery of said slug is flattened at one side to provide room for the resistor, and in which the periphery of the slug at another point has a radial pocket for the diode, one terminal of the diode being soldered in the bottom of said pocket, and the remainder of said diode being covered and sealed in said pocket by an insulation material.

16. A unit as defined in claim 4, in which the periphery of said slug is flattened at one side to provide room for the resistor, and in which the periphery of the slug at another point has a radial pocket for the diode, one terminal of the diode being soldered in the bottom of said pocket, and the remainder of said diode being covered and sealed in said pocket by an insulation material, and in which another part of the periphery of the slug is flattened to facilitate registered orientation of all of the units when assembling the same on a rod.

17. A unit as defined in claim 4, in which a part of the periphery of the slug is flattened to facilitate registered orientation of all of the units when assembling the same on a rod.

18. A unit as defined in claim 2, in which the diode is a silicon diode.

19. A unit as defined in claim 4, in which the diode is a silicon diode.

References Cited by the Examiner

UNITED STATES PATENTS

| | | | |
|---|---|---|---|
| 2,940,035 | 6/1960 | Lefkowitz | 317—256 |
| 3,059,165 | 10/1962 | Meykar | 317—101 |

LLOYD McCOLLUM, *Primary Examiner.*